(12) United States Patent
Benayon et al.

(10) Patent No.: US 6,249,852 B1
(45) Date of Patent: *Jun. 19, 2001

(54) METHOD FOR HEAP MANAGEMENT OF FIXED SIZED OBJECTS USING PAGES

(75) Inventors: Jay William Benayon, Thornhill; Graham W. Ewart, Don Mills, both of (CA)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,016

(22) Filed: May 8, 1998

(30) Foreign Application Priority Data

Jul. 31, 1997 (CA) .................................................. 2212354

(51) Int. Cl.[7] ....................................................... G06F 12/02
(52) U.S. Cl. ............................................................. 711/170
(58) Field of Search ...................................... 711/170, 171, 711/172, 173; 707/205

(56) References Cited

U.S. PATENT DOCUMENTS 5,561,785 * 10/1996 Blandy et al. ........................ 711/170

* cited by examiner

Primary Examiner—Kevin L. Ellis
(74) Attorney, Agent, or Firm—Scully, Scott, Murphy & Presser; Casey P. August

(57) ABSTRACT

The present invention relates to a method for managing storage for allocation and de-allocation requests of fixed size data objects. Fixed size data objects are allocated and de-allocated from a page list comprising a pool of memory pages and each page includes a reserved area for storing object information in common to all the objects in that page. A pool of pages, i.e. page list, is provided for each specific object size. A recycle page list is also provided for recycling pages in which all the objects have been returned.

12 Claims, 2 Drawing Sheets

METHOD FOR HEAP MANAGEMENT OF FIXED SIZED OBJECTS USING PAGES

BACKGROUND OF THE INVENTION

1. Technical Field

The present invention relates to memory management systems and more particularly to a system for managing memory pages for accessing fixed size data objects.

2. Prior Art

Many applications today are very heap intensive with respect to working set size and performance. In object-oriented programs written in $C^{++}$, objects are created and deleted from the heap with the life of an object often being very short.

A solution to increase the performance of these kind of applications is to use a very efficient heap allocator that can perform allocate and release operations in constant time and also minimize the "page hits" required, i.e. objects are allocated from minimal set of pages.

Known attempts to improve the performance of applications which manipulate large numbers of small data objects have included chaining released objects of a specific size in a linked list and reusing these objects for future allocations. While this approach results in faster performance than another known method which coalesces released objects, the chaining method for released objects can however result in unnecessary page hits during allocations. Another disadvantage is that the chaining of released objects will tend to increase the heap size since free objects cannot be recycled for other sizes. Furthermore, each object size is rounded to a factor suitable by the main heap allocator which may have heap working set size implications.

Therefore, there remains a need in the art to improve the speed of a heap allocator while at the same time reducing the working set size in a manner that is page sensitive. The method is preferably suitable for systems which utilize multiple user controlled heaps.

SUMMARY OF THE INVENTION

The present invention provides a page-based allocator and de-allocator for fixed size data objects.

According to a first aspect of the present invention, internal information, i.e. size, associated with a data object is stored external to the object as opposed to inside the object. The page-based allocator according to the present invention features a memory page structure in which objects of a specific size are obtained from a common set of pages that are shared with other objects of the same size. According to the invention, each page includes a reserved area for storing internal information relevant to the objects within the given page including object size and a user heap handle. The user heap handle indicates from which heap the page was obtained in a multiple heap system. During a release of an object, the page is determined by performing an arithmetic operation on the object address and the size and heap for the object is obtained by examining the reserved area of that page.

Since many pages of storage may be required to satisfy allocation requests within an application, the method according to the present invention also features a mechanism for chaining all the pages that are dedicated to a specific object size in a linked list. The chaining mechanism facilitates the insertion and deletion of a page in real time.

To reduce the working set size, i.e. the number of pages in the heap, the page allocator according to the present invention features a recycle mechanism for recycling pages in which all the objects have been returned.

In a first aspect, the present invention provides an allocator/de-allocator suitable for fixed size data objects, the allocator comprising: (a) a plurality of page lists, each of the page lists being intended for a specified object size range and comprising one or more pages for objects within the specified size range; (b) a range list array having means for storing pointers for each of the page lists, wherein the pointers include a cache pointer for pointing to the page being most recently accessed.

In a second aspect, the present invention provides a method for allocating a fixed size object in response to an allocation request specifying a size for the fixed size object, the method comprising the steps of: (a) rounding the specified size for the object; (b) determining a page list corresponding to the rounded object size; (c) allocating the object on the first available page in the page list; (d) if a page is not available in the selected page list, adding a page to the page list.

In another aspect, the present invention provides a method for freeing a fixed size object from a page list having one or more pages for the object size of interest, the method comprising the steps: (a) computing the page in the page list where the object resides from the address of the object; (b) releasing the object from the page determined in step (a); and (c) moving the page to a recycled page list if all the objects have been returned.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

The present invention provides a system to manage storage for allocation and de-allocation requests of fixed size data objects. The present invention is related to the invention disclosed in co-pending Ser. No. 09/067,578 filed in the name of the common applicant. According to the invention, fixed size data objects are allocated and de-allocated from a page list comprising a pool of memory pages and each page includes a reserved area for storing object information in common to all the objects in that page. A pool of pages, i.e. page list, is provided for each specific object size.

Figure 1:
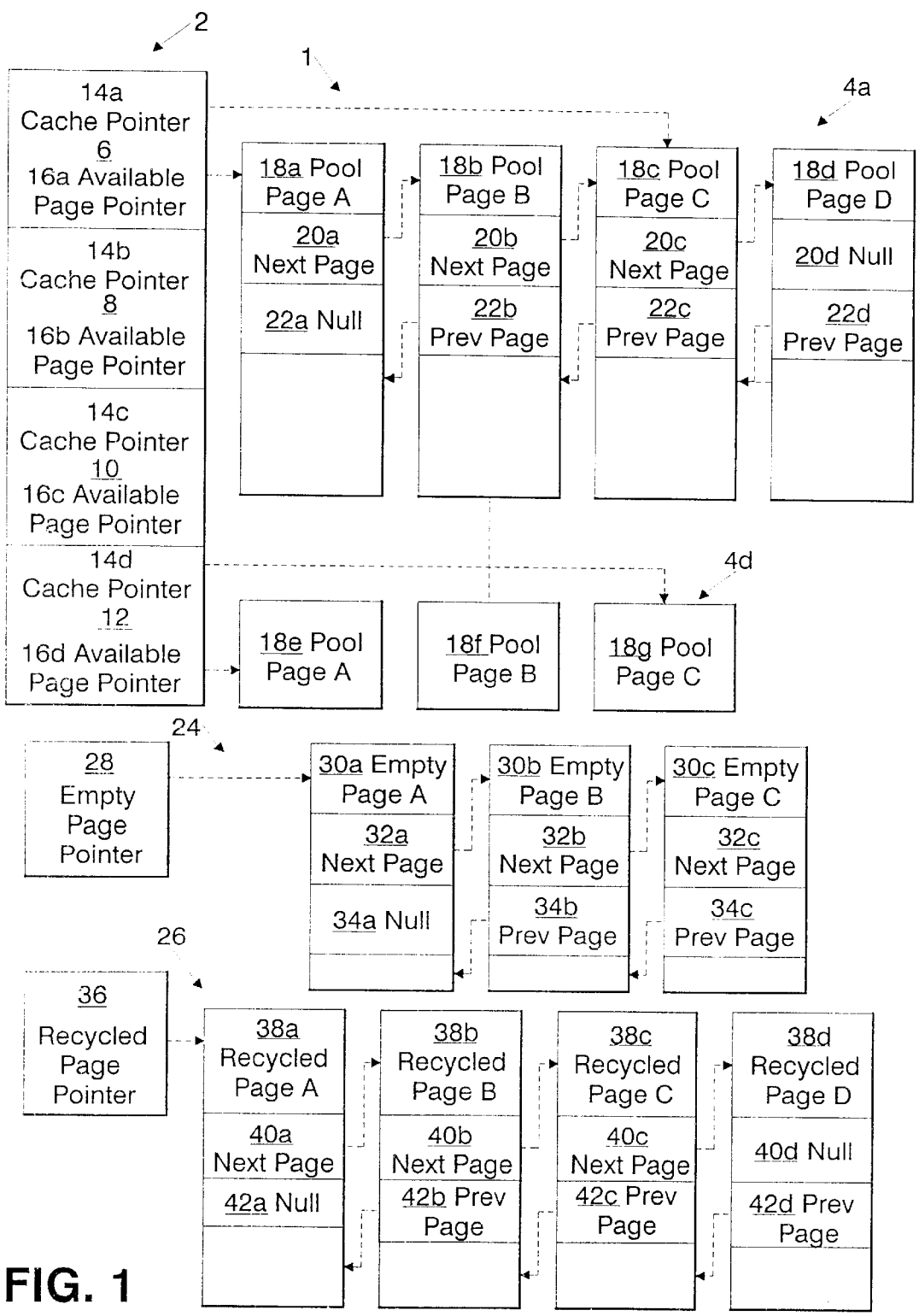
FIG. 1 is a schematic representation of a page-based allocator and de-allocator for fixed size data objects according to the present invention.

Reference is first made to FIG. 1 which shows a page-based allocator and de-allocator for fixed size objects 1 according to the present invention. The page-based allocator/de-allocator 1 comprises a range list 2 and an available page list 4 for each specific fixed object size. In FIG. 1, page list 4a and page list 4d are shown.

The range list 2 comprises a series of cells 6, 8, 10, 12 shown in FIG. 1. Each cell corresponds to a specific fixed object size. As shown in FIG. 1, each cell 6, 8, 10, 12 comprises a cache pointer 14 and a page available pointer 16 shown individually as 14a, 14b, 14c, 14d and 16a, 16b, 16c and 16d. Each cell 6 is accessed by an index value which is based on a rounded size corresponding to the object size in the allocation request from the user. The cache and the page available pointers 14, 16 point to pages in the page list 4 as will be described in more detail below.

In a multiple heap system, the range list 2 is allocated from the heap by a user invoked runtime library function. A suitable library function is of the form:

_upool (heap, min_size, max_size, flags)

The parameter heap specifies the heap for the pooled page list 4. The parameters min_size and max_size specify the lower and upper limits for the objects, for example, 17 bytes and 46 bytes, respectively. The flags parameters comprise the user set flags POOL_PRESERVE, and macros ALIGN_X) where X is 4, 8 or 16). If POOL_PRESERVE is SET, then returned pages 18 are retained in the respective page list 4. If NOT SET, returned pages 18 are placed on a recycled page list 26 as described in more detail below. The ALIGN_X parameter specifies the alignment boundary for the page lists 4, and preferably takes a value which is a multiple of 4, 8 or 16 in order to facilitate alignment of data on natural boundaries. For example, if the ALIGN_X is set to 4 and min_size_and max_size are specified as 17 and 46, respectively, then the resulting range list 2 will comprise 20, 24, 28, 32, 36, 40, 44 and 48 byte sized page lists 4.

The available page list structure 4 comprises one or more memory pages 18. As shown in FIG. 1, the page list 4a comprises four pages 18a, 18b, 18c and 18d. The pages 18a, 18b, 18c and 18d form a pool from which data objects that are a fixed size, e.g. 20 bytes or less in size, are allocated in response to a user request. The available page pointer 16a points to the location of the first page in the page list (or pool) 4a, in this example the location of page 18a. The cache pointer 14a points to the "last touched" page, in this case page 18c, and facilitates subsequent allocations as will be described in more detail below. Similarly, the page list 4d comprises a pool of three pages 18e, 18f, 18g. The available page pointer 16d points to page 18e and the cache pointer 14d points to the last "touched " page 18g.

Since many pages 18 of storage may be required to satisfy allocation requests (e.g. the function malloc( ) in the C programming language and the function new ( ) in C$^{++}$) within an application, the page list structure 4 includes the capability to chain all the pages 18 that are dedicated to a specific object size, for example "20 byte objects" in page list 4a. Each of the pages 18 includes a next page pointer 20 and a previous page pointer 22 for quick removal of the page 18 from the list 4. The next page pointers for page list 4a are shown individually as 20a, 20b, 20c and 20d, and point to the next page 18 in the page list or pool 4. The previous page pointers 22 are shown individually as 22a, 22b, 22c and 22c and point to the previous page 18. For example, the next page pointer 20a for the first pool page 18a points to the location of the second pool page 18b, and the previous page pointer 22b for the second pool page 18b points to the location of the first pool page 18a. Since a page does not follow the last page 18d, the next page pointer 20d will have a NULL value. Similarly, the previous page pointer 22a will have a NULL value.

According to the present invention, a page list 4 is provided for every unique rounded object size based on the object alignment within the pooled object size range. The alignment boundary is determined by the platform and will vary depending on the intended data types that will be stored in the object. It is therefore preferable to select a boundary that will not cause performance degradation with any data type. Advantageously the user should have an option to select a smaller alignment if reducing working set size is more important than having data objects aligned in optimal boundaries. Preferably, the range size for a cell is specified in multiples of 4, i.e. 4, 8 or 16, in order to facilitate alignment of data on natural boundaries. For the example structure shown in FIG. 1, the range list 2 may be arranged on a 16 byte alignment boundary as follows: first cell 6 for objects 20 bytes or less in size; second cell 8 for objects 36 bytes or less in size; third cell 10 for objects 52 bytes or less; and fourth cell 12 for objects 68 bytes or less. As will be described in more detail below, a request for an object allocation is routed to the correct page 1 in constant time.

As also shown in FIG. 1, the allocator and de-allocator for fixed size objects 1 also includes an empty page list 24 and a recycled page list 26. In the preferred embodiment, the empty page 24 and the recycled page 26 lists are not limited to a specific object size for operations within the heap.

The empty page list 24 comprises an empty page pointer 28 and one or more empty pages 30. The empty page pointer 28 points to the first empty page 30a. Subsequent empty pages 30b, 30c are linked by respective next empty page pointers 32 and previous empty page pointers 34. In the context of present description, an empty page 30 means a page which does not contain any unused data objects, i.e. all the data objects have been allocated. Advantageously, the empty page list 24 allows pages 30 without any free data objects to be removed from the available page lists 4. This permits a future allocation to be performed without any page searching required and can be done after an object is removed from the current page. A counter 'qout' is provided for this purpose and as will be described below, the counter qout is incremented/decremented whenever an object is allocated/de-allocated.

The recycle page list 26 comprises a recycled page pointer 36 and one or more recycled pages 38. A recycled page 38 comprises a page 18 which was previously used but all the objects have been returned, the page is "full". Instead of returning the page 18 to the system, the page 18 is recycled for the same or another object size. The recycled page pointer 36 points to the first recycled page 38a. Subsequent recycled pages 38b, 38c, 38d are linked by respective next recycled page pointers 40 and previous recycled page pointers 42. The operation of the next 40 and previous page 42 pointers is as described above for the available page list 4.

Advantageously, the recycling of pages 38 to other pooled object sizes results in a smaller working set size of pages 18, thereby easing demands on the memory resources for the system. By maintaining separate page lists 4 for every rounded object size, the number of pages that are touched during an allocation or de-allocation is also reduced. Furthermore, the cache pointer also minimizes the number of pages that are touched as will be described in more detail below.

Figure 2:
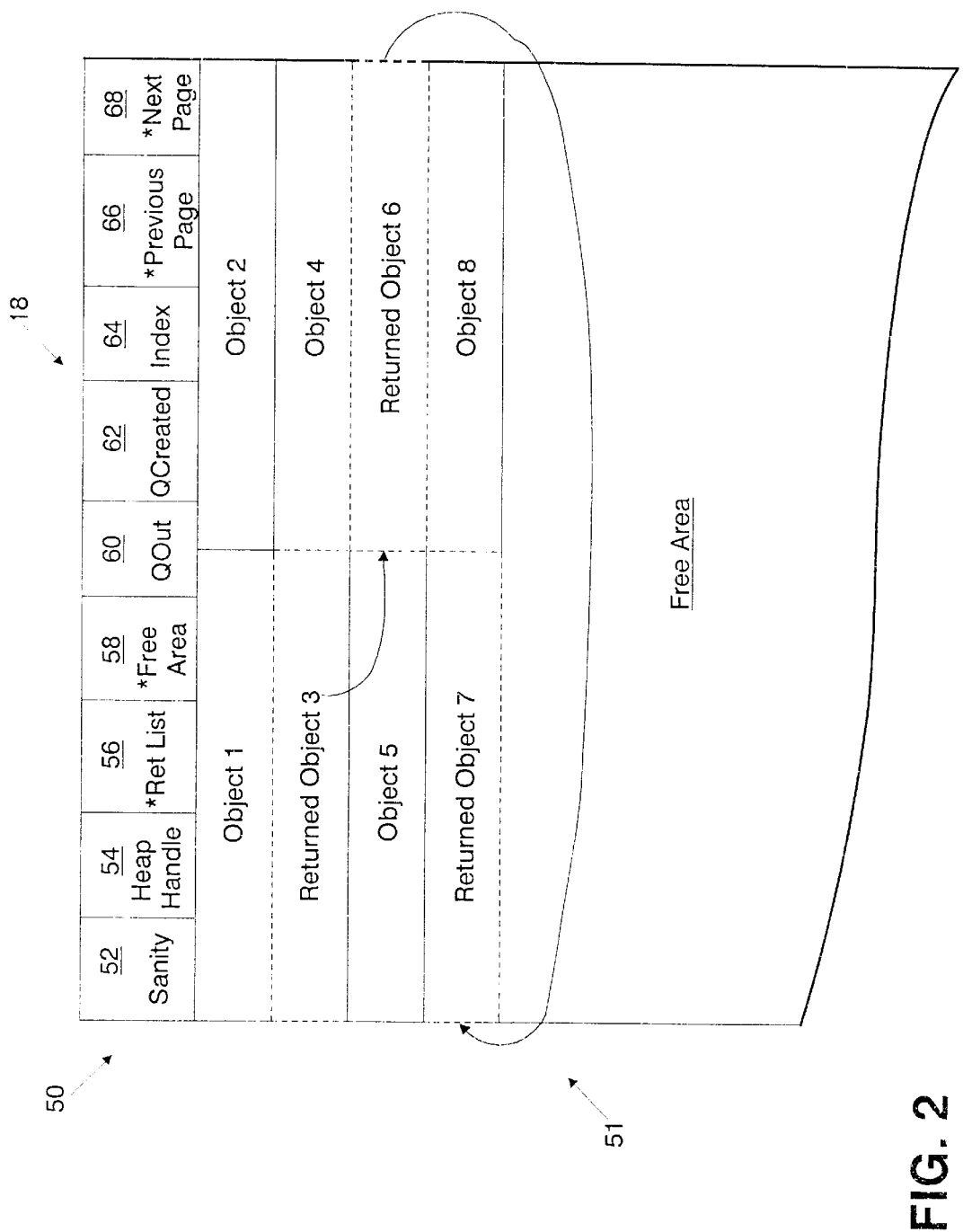
FIG. 2 is a schematic representation of a memory page for the page-based object allocator of FIG. 1.

Reference is next made to FIG. 2, which shows the arrangement of a page 18 in more detail. The page 18 comprises a reserved area 50 and a page body 51. The reserved area 50 provides a mechanism for optimally managing the allocation and de-allocation of objects in the page list 4. The page body 51 provides the memory space for allocating data objects of the size specific to the page, for example, objects 20 bytes or less in size as specified in the first cell 6 of the range list 2 in FIG. 1.

As shown in FIG. 2, the reserved area 50 comprises a sanity field 52, a heap handle field 54, a return list field 56, a free area field 58, a qout counter field 60, a created counter field 62, an index field 64, a previous page pointer 66, and a next page pointer 68. The page 18 may be implemented as a data structure as described by the following pseudocode:

```
struct __pool_page {
    unsigned            sanity
    Heap_t              heap handle;
    POOLOBJECT          *retlist;
    char                *freearea;
    unsigned            qout;
    unsigned            qcreated;
    unsigned            index;
    struct *__pool_page *previous page
    struct *__pool_page *next page
}
```

The sanity variable (field 52) denotes that the page 2 is used for fixed size objects as opposed to variable size objects. The heap handle (field 54) identifies the heap in a multiple heap system where storage is obtained. The retlist variable (field 56) comprises a pointer in a link list chaining all objects returned within the page. The freearea variable (field 58) comprises a pointer to the contiguous free area (i.e. page body 51 in FIG. 2) after the reserved area 50. The counter qout (field 60) specifies the quantity of objects that are in use from the page 18. The counter qcreate (field 62) specifies the quantity of objects that can fit in the given page. The index (field 64) comprises the index into the range list 2 (FIG. 1), and is used to access the current values of the cache 14 and available page 16 pointers. The indexes for the four cells 6, 8, 10, 12 are 0, 1, 2, 3, respectively. The previous page pointer field 66 stores the previous page pointer 22 which was described above with reference to FIG. 1. The previous page pointer 22 points to the previous page 18 and is used for insertion/deletion operations of pages 18 in the page list 4. The next page pointer field 68 stores the next page pointer 20 which was described above for FIG. 1. The next page pointer 20 points to the next page 18 in the page list 4 and is used for page insertion/deletion operations.

A method for allocating a fixed object in the page list 4 will now be described with reference to the following pseudocode listing.

0: void *allocate (Heap_t heap, size_t size)
1: lock heap to make thread safe
2: round object size to multiple of alignment (4, 8 or 16 bytes)
3: determine index in range list based on rounded object size
4: if pages are not available in the page list
5: if full pages are available to reuse from the recycled page list
6: add this page to the page list for the rounded object size
7: make the cache pointer point to this new page
8: else
9: acquire a new page from the heap or system
10: add page to the available page list for this rounded object size
11: make the cache pointer point to this new page
12: if retlist contains objects within the working page
13: set retptr to first object in retlist
14: update retlist to point to next free returned object
15: else if freearea is available
16: set retptr to freearea
17: increment freearea pointer by the rounded object size
18: if the freearea pointer exceeds the page
19: set the freearea pointer to NULL
20: increment the qout for the page
21: if no unused objects remain in the page
22: move the page to the empty list for this rounded object size
23: set cache pointer to either previous page or next page in list
24: unlock heap
25: return the address of the object pointed to by retptr The first step in Line 1 involves locking the heap to make it "thread safe", i.e. present multiple access to the cache and available page pointers. In Line 2 of the present method involves rounding the requested object size to a multiple of the predetermined alignment boundaries. The next step in Line 3 involves determining the index in the range list 2 (FIG. 1) for object size of interest.

Next in Line 4, the availability of pages 18 in the page list 4 for the object size of interest is checked. If there are no pages available for allocating objects, the recycled page list 26 is checked (Line 5) for the availability of any recycled pages 38 (FIG. 1). If a recycled page 38 is available, the recycled page is added to the page list for the rounded object size (Line 6) and the cache pointer is made to point to this new page (Line 7). If this is also the first page in the page list, then the available page pointer is also made to the point to the page. If there are no recycled pages available, then a user heap callback function is utilized to "grow" the heap (Line 9). The newly acquired page is then added to the page list for this rounded object size (Line 10), and the cache pointer is set to point to this new page (Line 11).

Next, or if a page is available (Line 4 described above), the return list pointer is checked in Line 12 to determine if there are any free objects remaining in the page. If there are free objects available in the page, the return pointer (to the user allocation request) is set to the first free object in the return list pointer (Line 13). Next in Line 14, the return list pointer is incremented to point to the next free object in the page. If the page does not contain any returned objects, then the freearea in the page is checked (Line 15). If there is space in the freearea, the return pointer is set to the freearea (Line 16) and the freearea pointer is incremented by the rounded object size (e.g. 20) for a rounded object size of 20 bytes) in Line 17. If there is no space left in the freearea (Line 18), the freearea pointer is set to NULL (Line 19).

Next in Line 20, the counter qout is incremented. Based on the value of qout, it is determined if the page is empty, i.e. all of the objects have been allocated (Line 21). If empty, the page is moved to the empty page list 24 (FIG. 1) in Line 22. In Line 23, the cache pointer is set to either the previous page or the next page in the page list from which the page was moved.

In Line 24, the heap is unlocked, and the address of the allocated object pointed to by the return pointer retptr is returned to the user, e.g. in response to a malloc ( ) call in C.

For a release or free operation, the size and heap are obtained from the reserved portion 50 of the page 18 (FIG. 2) and the page 18 is derived from the object address. The freed object is placed on the return list for a future allocation of the same object size in the page 18 that owns this object. If the page 18 was on the empty page list, then the page 18 is moved back to the available page list 4, because an object is now available for allocation. In either case, the cache pointer 14 for this object size is set to point to this page (e.g. page 18c in FIG. 1) so that the next allocation will be obtained from this page 18c for this object size. This feature minimizes the page swapping necessary by reusing the previously freed object.

To minimize the working set size in the event that a given object size is no longer needed within an application, a page containing objects will be reused for other object sizes whenever all objects within a page have been returned. This page is added to the recycled page list 26 provided to a specific object size list when growth is necessary. Preferably this operation is the default action. Alternatively, preserving pages within an object size will increase performance within applications that specifically will reuse all object sizes within a given pool.

When a page list 4 requires another page to satisfy an allocation request, a new page is obtained from the recycled page list 26 (FIG. 1) if available, from the variable sized heap or from the system. In all cases, the reserved area 50 within the page 18 is initialized, the quantity of objects (i.e. qcreate) that can be extracted from the page is determined. In the preferred embodiment, instead of creating a link list during initialization, the freearea pointer is set to the available free area past the reserved area within the page and the "freearea" is incremented by the object size during each allocation. Once the end of the page is reached this pointer is cleared and no longer used. For objects that are returned at any point, the objects are placed in the return object list within the page and used for future allocations. Advantageously, this feature saves the time required to chain all the objects within a page which may be unnecessary if only a few objects are used for a particular size. In the alternative, a link list of the objects that can be allocated from the page is created.

A method for freeing a fixed object in the page list 4 will now be described with reference to the following pseudocode listing.

```
1: void deallocate (void*object)
2: compute the page where the object resides and verify
   sanity
3: lock heap for heap specified in the reserved area
4: decrement the qout counter within the page reserved area
5: if other objects from the page are in use (qout>0) of the
   flag POOL_RESERVE is set
6: if the page is on the empty page list (retlist=0 and
   freearea=0)
7: move page to the next available page list
8: chain the object released to the retlist linked list
9: mark the cache for this object size to this page
10: else
11: if page is on empty list (retlist=0 and freearea=0)
12: remove page from empty page list
13: else
14: remove page from available page list
15: set cache for this object size to page last touched during
    removal
16: insert this page in recycled page list
17: unlock heap
```

The first step in Line 2 involves computing the page where the object resides. The page is determined by performing an arithmetic operation on the object address. In a 32 bit system with a page size of 4096 bytes, the least significant bits are masked. The next step in Line 3 involves locking the heap to make the heap thread safe as will be understood by those skilled in the art.

Next in Line 4, the counter qout is decremented and a new value stored in field 60 of the reserved area 50 in the page 18. In Line 5, it is determined if the page is to be kept in the page list. If an object is in use (i.e. qout 0) of the flag POOL_PRESERVE is SET, then the object is maintained in the page list. If the page from which the object is being returned was in the empty list (Line 6), the page is moved to the available page list (Line 7). Next in Line 8, the released object address is chained to the linked lost for the return list. Since this page becomes the last "touched" page, the cache pointer is moved to point to this page (Line 9).

If the page is on the empty page list (Line 11), the page is removed from the empty page list (Line 12). Otherwise, the page is removed from the available page list (Line 14), and the cache pointer for this object size is set to the previous page or the next page depending on which page was last touched during the removal operation (Line 15). The removed page is inserted in the recycled page list (Line 16), and the heap is unlocked (Line 17).

In summary, the present invention provides a page-based allocator and de-allocator for fixed size data objects which provides improved performance, page sensitivity and working set size. Furthermore, the present invention is suitable for multiple heap systems and does not require the user to provide the heap handle for each de-allocation.

While the invention has been particularly shown and described with respect to preferred embodiments thereof, it will be understood by those skilled in the art that the foregoing and other changes in form and details may be made thereon without departing from the spirit and scope of the invention.

Having thus described our invention, what we claim as new, and desire to secure by Letters Patent is:

1. An allocator/de-allocator suitable for fixed size data objects in a virtual storage system, said allocator comprising:
   (a) a plurality of page lists, each of said page lists being intended for a specified object size range and comprising one or more pages for objects within the specified object size range;
   (b) a range list array having means for storing pointers for each of said page lists, wherein said pointers include a cache pointer for pointing to the page being most recently accessed for object allocation and de-allocation requests; and
   (c) a data structure within each of said one or more pages providing a mechanism for managing said object allocation and de-allocation requests within a page pointed to by said cache pointer for the specified object size range.

2. The allocator/de-allocator as claimed in claim 1, further including an empty page list for holding empty pages, wherein an empty page comprises a page in which all the objects have been allocated, and means for moving an empty page from one of said page lists to said empty page list.

3. The allocator/de-allocator as claimed in claim 1, further including a recycled page list for holding recycled pages, wherein a recycled page comprises a page in which all the objects have been returned and thereby available for immediate reuse.

4. The allocator/de-allocator as claimed in claim 3, wherein said recycled page list is accessible from all of said page lists.

5. A method for allocating a fixed size object in response to an allocation request specifying a size for the fixed size object in a virtual storage system, said method comprising the steps of:
   (a) rounding the specified size for the object;
   (b) determining a page list corresponding to said rounded object size, said page list intended for a specified object size range;
   (c) allocating said object on a first available page in said page list pointed to by a cache pointer, said cache pointer for pointing to a page being most recently accessed for object allocation and de-allocation requests;
   (d) adding a page to said page list if a page is not available in said selected page list, pointing said cache pointer to the added page, and allocating said object on said added page pointed to by said cache pointer; and (e) managing subsequent object allocation requests to said first available page or said added page, wherein a data structure within said first available page or said added page provides a mechanism for managing said subsequent object allocation requests within a page pointed to by said cache pointer for a specified object size range.

6. The method as claimed in claim 5, wherein said additional page is obtained from a recycled page list, wherein a recycled page is a page in which all the objects have been returned.

7. The method as claimed in claim 5, further including the step of moving a page in which all the objects have been allocated to an empty page list.

8. A method for de-allocating a fixed size object from a page list having one or more pages for an object size of interest in a virtual storage system, said method comprising the steps:

(a) computing a page in the page list where the object resides from the address of the object;

(b) releasing the object from the page determined in step (a) by managing a data structure within the page which provides a mechanism for managing object allocation and de-allocation requests, said data structure including a return object queue, and pointing a cache pointer to said page, said cache pointer for pointing to the page most recently accessed for object allocation and de-allocation requests;

(c) queuing the released object on the return object queue; and (d) moving the page to a recycled page list if all the objects within the page have been returned to the return object queue.

9. A data storage media recorded with a computer program which, in combination with a general purpose computer loaded with an operating system and runtime library means, equipped to read into memory and execute program data from the data storage media, constitutes a method for allocating a fixed size object in response to an allocation request specifying a size for the fixed size object in a virtual storage system, said method comprising the steps of:

(a) rounding the specified size for the object;

(b) determining a page list corresponding to said rounded object size, said page list intended for a specified object size range;

(c) allocating said object on a first available page in said page list pointed to by a cache pointer, said cache pointer for pointing to a page being most recently accessed for object allocation and de-allocation requests;

(d) adding a page to said page list if a page is not available in said selected page list, pointing said cache pointer to the added page, and allocating said object on said added page pointed to by said cache pointer; and (e) managing subsequent object allocation requests to said first available page or said added page, wherein a data structure within said first available page or said added page provides a mechanism for managing said subsequent object allocation requests within a page pointed to by said cache pointer for a specified object size range.

10. The data storage media in accordance with claim 9, wherein said added page is obtained from a recycled page list, a recycled page being a page in which all the objects have been returned.

11. The data storage media in accordance with claim 9, wherein said method further includes the step of moving a page in which all the objects have been allocated to an empty page list.

12. A data storage media recorded with a computer program which, in combination with a general purpose computer loaded with an operating system and runtime library means, equipped to read into memory and execute program data from the data storage media, constitutes a method for de-allocating a fixed size object from a page list having one or more pages for the object size of interest in a virtual storage system, said method comprising the steps:

(a) computing the page in the page list where the object resides from the address of the object;

(b) releasing the object from the page determined in step (a) by managing a data structure within the page which provides a mechanism for managing object allocation and de-allocation requests, said data structure including a return object queue, and pointing a cache pointer to said page, said cache pointer for pointing to the pare most recently accessed for object allocation and de-allocation requests;

(c) queuing the released object on the return object queue; and (d) moving the page to a recycled page list if all the objects within the page have been returned to the return object queue.

* * * * *